3,446,627
RAPID MANUFACTURE OF CHEESE
Peter P. Noznick, Evanston, Robert H. Bundus, Riverside, and Anthony J. Luksas, Chicago, Ill., assignors to Beatrice Foods Co., Chicago, Ill., a corporation of Delaware
No Drawing. Continuation of application Ser. No. 407,525, Oct. 29, 1964. This application Apr. 18, 1968, Ser. No. 722,496
Int. Cl. A23c *19/02, 19/14*
U.S. Cl. 99—115      7 Claims

ABSTRACT OF THE DISCLOSURE

The ripening process of unripened cheese is accelerated by carrying out the ripening process in an aqueous fluid system having the cheese therein in a macerated form. The fluid system is vigorously agitated for 2 to 10 days to accomplish the ripening of the cheese.

This application is a continuation of application Ser. No. 407,525 filed Oct. 29, 1964, and now abandoned.

The present invention relates to the rapid manufacture of cheese.

It is a primary object of the present invention to accelerate the ripening process in the manufacture of cheese.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by ripening the cheese under conditions which comprise constantly agitating the substrate under growth conditions favorable for the organism. The cheese is ripened in a period of 2–10 days rather than the 6 weeks to one year, normally required.

The process of the present invention is useful in making cheddar cheese, swiss cheese, Neufchatel, brick, limburger, camembert, edam, muenster, provolone, Romano, Parmesan, Gouda or Liederkranz.

As the growth medium there is employed any suitable protein-carbohydrate system with or without fat. Such a system is provided by whole milk, skim milk, cream, or a mixture of vegetable proteins and a sugar with or without vegetable fat. Preferably there are employed simple hexose sugars such as glucose, galactose, lactose, fructose, or sorbose, i.e. sugars which will not form sucrose in the process. There can also be employed xylose, arabinose, rhamnose, or maltose. The sugar selected, of course, must be one on which the bacteria, fungi or yeast can act. The vegetable protein can be soy protein, peanut protein, the glucose or other sugar must be employed in an amount sufficient to sustain the bacterial action. The system is sterilized, usually at 9–50% solids (in water) prior to adding the desired culture. It is also desirable to maintain a proper salt balance favorable to the growth of the organism.

After sterilization the desired culture, either bacteriological or mycological, are introduced with or without enzymes. Optimum growth conditions for the particular organism are then maintained. These conditions may be aerobic or anaerobic and can vary widely in temperature depending on the organism. Thus some cultures grow best at 124° F. (thermophilic organisms), others at 98° F. and still others at 71° F. or 35° F.

The conditions are chosen to favor the desired organism. The use of anaerobic or aerobic conditions or a condition between the two can be selected depending on the oxygen demand of the organism.

The liquid system after flavor development, is formed into plastic consistency by the removal of moisture or is completely dehydrated by spray drying, roller drying or freeze drying.

As previously set forth it is critical to agitate during the growth of the cultured organism on the substrate.

Illustrative examples of suitable organisms are set forth below (including in some instances the preferred growth temperature).

Thus there can be employed Streptococcus organisms of the Micrococcus group, e.g. *Streptococcus lactis* (98° F.), *Streptococcus thermophilus* (124° F.), *Streptococcus citrovorus* (71° F.), *Streptococcus paracitrovorous* (71° F.), *Streptococcus creamoris* (90° F.), *Streptococcus liquefaciens, Streptococcus zymogenes, Streptococcus fecalis* (110° F.), *Streptococcus durans* (110° F.), as well as Bacilli, e.g. *Lactobacillus lactis* (86° F.), *Lactobacillus helveticus* (86° F.), *Lactobacillus acidophilus, Lactobacillus bulgaricus* (102–107° F.), *Lactobacillus thermophilis* (100° F.), *Lactobacillus delbrueckii* (124° F.), *Lactobacillus casei, Lactobacillus plantarium*. There can also be included Flavobacterium or organisms of the genus Leuconostoc as Bacterium erythrogens and Bacterium linens.

In order to make swiss cheese there is normally employed Proprionibacterium of either the shermonii or petersonii species.

Typical examples of suitable molds include *Penicillium camembertii* (either white or rogeri), *Penicillium friquentans*, as well as organisms of the Aspergillus, Rhizopus, Mycoderma or Mucor genera.

The above organisms are grown on a culture medium of the type set forth supra and then filtered off through a bacteriological filter, e.g. a Seitz, Selas, or Berkfeld filter. The active substance is present in the filtrate due to the enzymes developed by the growth of the bacteria.

Unless otherwise indicated all parts and percentages are by weight.

Example 1

30 day old cheddar cheese was macerated and fluidized with water to 30% solids. It was then introduced to a sterile incubation container and maintained under anaerobic conditions (a nitrogen atmosphere) at 85° F. and incubated for 2 days with constant agitation. This promoted the growth and reproduction of the anaerobic bacteria commonly found in cheddar cheese and materially hastened the ripening process. The thus cultured product was spray dried to give a highly flavored cheddar cheese powder equivalent in flavor to a cheddar cheese which has been aged 12 months.

The present procedure is based on a fluid ripening system rather than the conventional procedure in cheese manufacture of precipitating the protein and pressing into a mass and allowing the product to ripen.

Also the present procedure requires vigorous agitation during the ripening process. The process also only requires a relatively short period of time, e.g. 10 days or less.

While the examples disclose drying, e.g. spray drying or roller drying the product of the present invention can be pressed to remove most of the water or the water can be evaporated.

As used in the present specification and claims the terms "a fluid system" means that the protein solids (with or without carbohydrates and fat) are suspended in water. The solids content in the fluid system is usually 10–50%.

The present invention in its preferred form when used to prepare cheddar cheese differs from customary cheddar cheese manufacturing operations by employing anaerobic rather than aerobic conditions.

What is claimed is:

1. In a process for producing ripened cheese selected from cheddar cheese, swiss cheese, Neufchatel, brick, limburger, camembert, edam, muenster, provolone, Romano, Parmesan, Gouda and Liederkranz by precipitating fat containing proteins from a cheese forming system having cheese flavor organisms therein to provide a precipitated protein mass, allowing the substantially unripened protein mass to ripen for up to one year to grow the cheese flavor organisms associated with the protein mass, and develop the aged cheese flavor, the improvement comprising macerating the precipitated and substantially unripened protein mass and suspending the macerated protein mass in water to produce a fluid system having 10% to 50% by weight of protein solids therein and wherein the fluid system consists essentially of water, the macerated protein solids and the ripening organisms, vigorously agitating the fluid system for 2 to 10 days under conditions favorable for growth of the cheese flavor organisms, whereby the flavor organisms rapidly grow and the protein is rapidly ripened and becomes highly flavored cheese, and thereafter drying the so-produced ripened cheese.

2. A process according to claim 1 wherein the drying is spray drying.

3. The process of claim 1 wherein the macerated protien mass is substantially unripened cheddar cheese.

4. The process of claim 3 wherein temperature of the agitation step is from 35° F. to 124 F.

5. The process of claim 4 wherein the substantially unripened cheddar cheese is at least one month old.

6. The process of claim 5 wherein the temperature is about 85° F. and the fluid system is about 30% solids.

7. A process of rapidly forming cheddar cheese comprising macerating 1 month old cheddar cheese, fluidizing with water to 30% solids and ripening the cheese at 85° F. under anaerobic conditions for 2 days with continuous agitation.

References Cited

UNITED STATES PATENTS 2,965,492    12/1960    Bauman et al.
3,072,488    1/1963    Watts et al.

LIONEL SHAPIRO, *Primary Examiner.*

D. M. NAFF, *Assistant Examiner.*

U.S. Cl. X.R.

99—59